(12) United States Patent
Gilroy et al.

(10) Patent No.: X8819
(45) Date of Patent: May 9, 1835

(54) LOOM, DAMASK

(76) Inventors: Patrick M. Gilroy; Abner S. Tompkins

Patrick M. Gilroy & Abner S. Tompkins.
Letters Patent

The schedule referred to in these Letters Patent and making part of the same, containing a description in the words of the said Patrick M. Gilroy & Abner S. Tompkins, themselves, of their improvement in the Damask Loom.

---

To all to whom these presents shall come: Be it known, that we, Abner S. Tompkins of North Providence, in the County of Providence, and Patrick M. Gilroy, of Warwick, in the County of Kent, and both in the State of Rhode Island, have invented a new and useful improvement in the damask loom, consisting of the application of water or other power to drive the loom, and the following is a description of the machinery by which this result is produced viz:- Two suitable shafts are placed across near the centre of the loom, running on bearings, one on the lower and the other on the upper girths. The power is applied by a belt to a pulley on one end of the upper shaft - a small gear wheel on the other end of this shaft gears into a large one on the bottom shaft. On the lower shaft is a set of cambs the number corresponding with the number of treaders to be used which varies with the kind of work to be performed. The large camb in the above set by means of a large treaddle turns the cylinder (as it is commonly called though it is a square block) by which the figure is produced & governs the same. Instead of this treaddle, a perpendicular leaver with a pulley on it for the large camb to bear on, may be used. The large camb & the large treaddle or lever and pulley are connected with the back harness by means of levers & rods & weights to govern them. — The other cambs above refered to spring the treaddles connected with the front harness, & give the shed for the shuttle to pass through - The shuttle is thrown by a triangle attached to the sword of the lay. - Near the ends of the lower shaft are two cambs connected with the shuttle motion by a lever & rod, the effect of which, is to suspend the motion of the shuttle at pleasure, for any purpose, and leave the loom in operation. The back end of the triangle strikes against the face of a dog, which is connected with the upper end of the rod aforesaid. and is attached to the plate of the loom on the back side of the sword of the lay —
The lay is suspended on bearings placed on the top plates of the loom, but may be hung at the bottom, as in the common Power Loom. The motion of the lay is produced by sweeps connected with it & a crank on each end of the top shaft. There is a set screw in the above triangle to govern the Traverse of the shuttle lever, or the set screw may be put into the sword of the lay. The dog face has a slant in it and is confined to the dog by a set screw — We claim as our improvement the above combination of machinery, constituting the application of power to drive the damask loom. and particularly the large camb & large Treaddle, or the lever & pulley as a substitute and the two small cambs at each end of the cotton shaft.

Witnesses
Nathan Whiting
John F. Green

Abner S. Tompkins
Patrick M. Gilroy